(12) United States Patent
Taube

(10) Patent No.: US 9,597,631 B2
(45) Date of Patent: Mar. 21, 2017

(54) SYSTEMS FOR RECOVERING AMMONIA

(71) Applicant: Climax Molybdenum Company, Phoenix, AZ (US)

(72) Inventor: Joel A. Taube, Fort Madison, IA (US)

(73) Assignee: Climax Molybdenum Company, Phoenix, AZ (US)

(*) Notice: Subject to any disclaimer, the term of this patent is extended or adjusted under 35 U.S.C. 154(b) by 0 days.

(21) Appl. No.: 15/151,915

(22) Filed: May 11, 2016

(65) Prior Publication Data

US 2016/0256817 A1    Sep. 8, 2016

Related U.S. Application Data

(62) Division of application No. 14/661,303, filed on Mar. 18, 2015, now Pat. No. 9,364,788.

(60) Provisional application No. 61/968,702, filed on Mar. 21, 2014.

(51) Int. Cl.
| | |
|---|---|
| *B01D 53/14* | (2006.01) |
| *B01D 53/78* | (2006.01) |
| *B01D 53/58* | (2006.01) |
| *B01D 53/18* | (2006.01) |

(52) U.S. Cl.
CPC ..... *B01D 53/1493* (2013.01); *B01D 53/1406* (2013.01); *B01D 53/1412* (2013.01); *B01D 53/185* (2013.01); *B01D 53/58* (2013.01); *B01D 53/78* (2013.01); *B01D 2251/50* (2013.01); *B01D 2252/10* (2013.01)

(58) Field of Classification Search
CPC ..... B01D 2251/50; B01D 53/58; B01D 53/78
See application file for complete search history.

(56) References Cited

U.S. PATENT DOCUMENTS

| | | |
|---|---|---|
| 2,746,843 A | 5/1956 | Bellringer |
| 3,931,044 A | 1/1976 | Maurin |
| 4,058,375 A | 11/1977 | Lawrence |
| 4,259,302 A | 3/1981 | Katz et al. |

(Continued)

OTHER PUBLICATIONS

PCT International Search Report and Written Opinion, corresponding to PCT Application No. PCT/US2015/021392, dated Jun. 17, 2015, 11 pages.

*Primary Examiner* — Duane Smith
*Assistant Examiner* — Cabrena Holecek
(74) *Attorney, Agent, or Firm* — Fennemore Craig, P.C.

(57) ABSTRACT

Apparatus for removing ammonia from a gas stream includes primary and secondary scrubbers each of which includes a gas inlet, a gas outlet, and a slurry atomizer. The gas inlet of the primary scrubber is operatively connected to a gas stream having ammonia contained therein. A primary slurry feed system operatively connected to the slurry atomizer of the primary scrubber feeds to the slurry atomizer a primary slurry composition of a molybdic acid at a pH level. The gas inlet of the secondary scrubber is operatively connected to the gas outlet of the primary scrubber. A secondary slurry feed system operatively connected to a slurry atomizer of the secondary scrubber feeds to the slurry atomizer a secondary slurry composition of a molybdic acid at pH level. The pH level of the secondary slurry composition is lower than the pH level of the primary slurry composition.

16 Claims, 3 Drawing Sheets

(56) References Cited

U.S. PATENT DOCUMENTS

| | | | |
|---|---|---|---|
| 5,565,180 A * | 10/1996 | Spink | B01D 53/34 |
| | | | 423/220 |
| 5,788,944 A * | 8/1998 | Kikkawa | B01D 53/30 |
| | | | 422/110 |
| 8,029,753 B2 | 10/2011 | Breault | |
| 2009/0054225 A1 | 2/2009 | Mironov et al. | |
| 2011/0300470 A1 | 12/2011 | Olbrich et al. | |
| 2013/0251609 A1 | 9/2013 | Rockandel et al. | |

\* cited by examiner

SYSTEMS FOR RECOVERING AMMONIA

CROSS-REFERENCE TO RELATED APPLICATIONS

This application is a divisional of U.S. patent application Ser. No. 14/661,303, filed on Mar. 18, 2015, now U.S. Pat. No. 9,364,788, which claims the benefit of U.S. provisional patent application Ser. No. 61/968,702, filed on Mar. 21, 2014, both of which are hereby incorporated herein by reference for all that they disclose.

TECHNICAL FIELD

This invention relates to gas scrubbing systems in general and more specifically to systems for recovering ammonia contained in gas streams.

BACKGROUND

Gas scrubbing systems are well-known in the art and are used to remove a wide range of compounds contained in untreated gaseous emissions from various types of processes. In one particular application, gas scrubbing systems have been developed to remove ammonia ($NH_3$) from gas streams, typically by contacting the gas streams with various types of packed beds, spray chambers, and water jets. Because ammonia is alkaline, many types of ammonia scrubbing systems use an acid solution, typically sulfuric acid, to remove or scrub the ammonia from the gas stream.

While such ammonia scrubbers are known and used in a wide variety of applications, they can be difficult to implement in certain applications due to material handling problems, clogging, and filtering requirements. Consequently, improved systems and methods of removing ammonia from gas streams are constantly being sought.

SUMMARY OF THE INVENTION

One embodiment of a method of removing ammonia from a gas stream may involve the steps of: Providing a primary slurry composition of a molybdic acid at a first pH; providing a secondary slurry composition of a molybdic acid at a second pH, the second pH being numerically lower than the first pH; atomizing the primary slurry composition in the presence of the gas stream to produce a partially processed gas stream, quantities of ammonia in the gas stream combining with the molybdic acid in the primary slurry composition to form a further concentrated primary ammoniated slurry composition; and atomizing the secondary slurry composition in the presence of the partially processed gas stream to produce a processed gas stream, additional quantities of ammonia in the partially processed gas stream combining with the molybdic acid in the secondary slurry composition to form a further concentrated secondary ammoniated slurry composition.

Another method of removing ammonia from a gas stream, may include the steps of: Providing a primary slurry composition of a molybdic acid at a pH level; providing a secondary slurry composition comprising molybdic acid at a pH level, the pH level of the secondary slurry composition being numerically lower than the pH level of the primary slurry composition; atomizing the primary slurry composition in the presence of the gas stream to produce a partially processed gas stream, quantities of ammonia in the gas stream combining with the molybdic acid in the primary slurry composition to form primarily ammonium dimolybdate; and atomizing the secondary slurry composition in the presence of the partially processed gas stream to produce a processed gas stream, additional quantities of ammonia in the partially processed gas stream combining with the molybdic acid in the secondary slurry composition to form primarily ammonium heptamolybdate.

Also disclosed is apparatus for removing ammonia from a gas stream that includes a primary scrubber having a gas inlet, a gas outlet, and a slurry atomizer. The gas inlet of the primary scrubber is operatively connected to the gas stream having ammonia contained therein. A primary slurry feed system operatively connected to the slurry atomizer of the primary scrubber feeds to the slurry atomizer a primary slurry composition of a molybdic acid at a pH level. A secondary scrubber includes a gas inlet, a gas outlet, and a slurry atomizer. The gas inlet of the secondary scrubber is operatively connected to the gas outlet of the primary scrubber. A secondary slurry feed system operatively connected to the slurry atomizer of the secondary scrubber feeds to the slurry atomizer a secondary slurry composition of a molybdic acid at pH level, the pH level of the secondary slurry composition being lower than the pH level of the primary slurry composition.

In operation, the apparatus atomizes the primary slurry composition in the primary scrubber. The atomized primary slurry composition absorbs quantities of ammonia contained in the gas stream to produce a partially processed gas stream. The partially processed gas stream exits the primary scrubber via the gas outlet and enters the secondary scrubber via the gas inlet. The apparatus atomizes the secondary slurry composition in the secondary scrubber. The atomized secondary slurry absorbs additional quantities of ammonia contained in the partially processed gas stream to produce a processed gas stream. The processed gas stream exits the secondary scrubber via the gas outlet.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
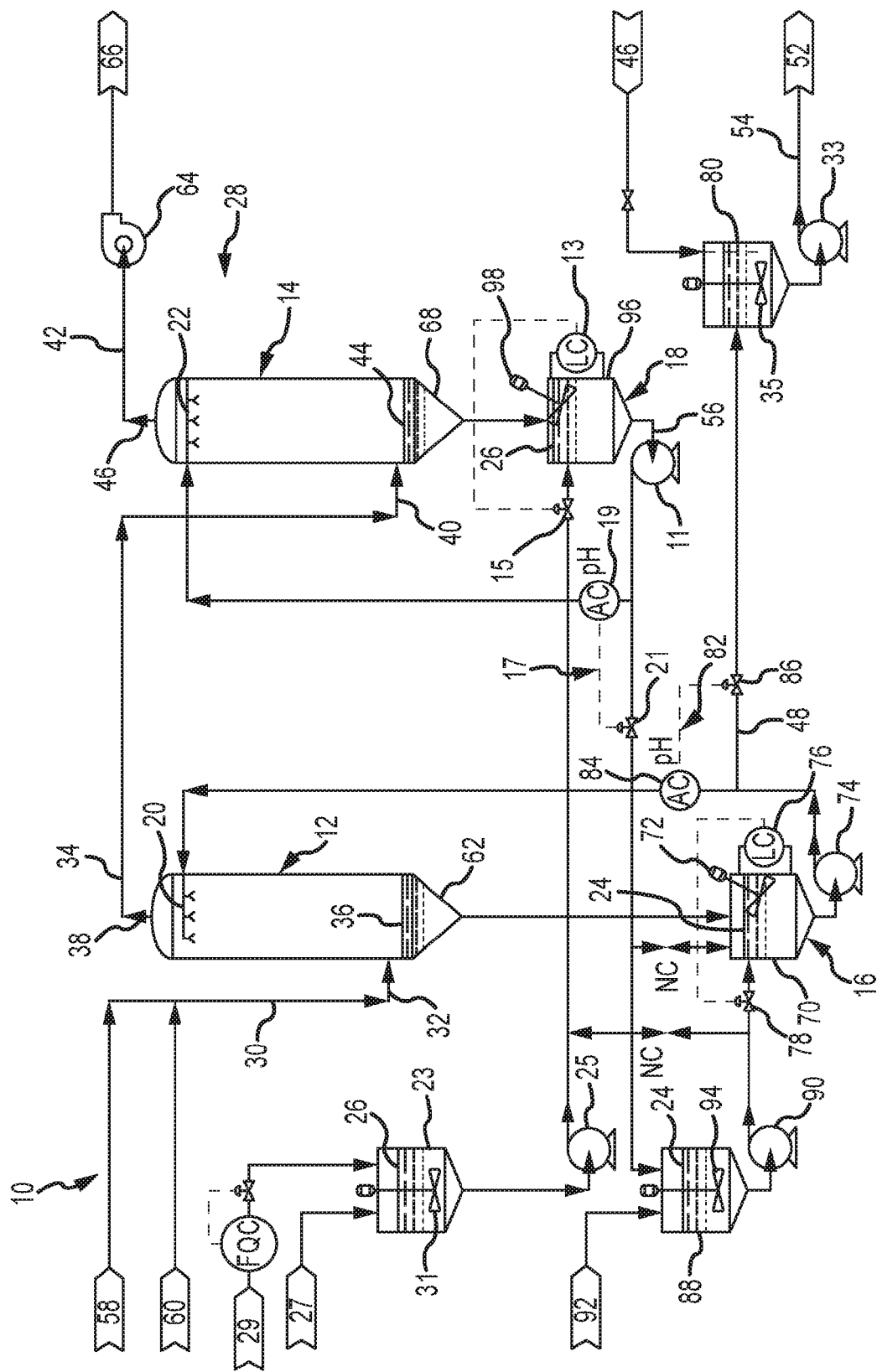
FIG. 1 is a schematic representation of an ammonia recovery system according to one embodiment of the invention.

One embodiment of an ammonia recovery system 10 according to the teachings of the present invention is schematically illustrated in FIG. 1 and may comprise at least two scrubbers, a first or primary scrubber 12 and a secondary scrubber 14. Alternatively, three or more scrubbers could be used in other embodiments. The primary and secondary scrubbers 12 and 14 may be operatively associated with respective primary and secondary slurry feed systems 16 and 18. The first or primary slurry feed system 16 may be operatively connected to a slurry atomizer 20 provided within the primary scrubber 12. Similarly, the secondary slurry feed system 18 may be operatively connected to a slurry atomizer 22 provided within the secondary scrubber 14. The primary and secondary slurry feed systems 16 and 18 feed respective primary and secondary slurry compositions 24 and 26 to the respective slurry atomizers 20 and 22.

As will be discussed in much greater detail herein, the primary and secondary slurry compositions 24 and 26 both may comprise molybdic acid, but at different pH and specific gravity levels. Generally speaking, the pH of the first or primary slurry composition 24 will be numerically greater than the pH of the secondary slurry composition 26. Conversely, the specific gravity of the primary slurry composition 24 will be lower than the specific gravity of the secondary slurry composition 26.

The system 10 may be operated in accordance with a method 28 in order to remove ammonia ($NH_3$) contained in a gas stream 30. Briefly, the method 28 may involve providing the first or primary slurry composition 24 to the atomizer 20 provided in the primary scrubber 12. As already mentioned, the primary slurry composition 24 may comprise molybdic acid having a pH that is controlled to be generally greater than about 7, preferably in a range of about 7 to about 9.5, and more preferably in a range of about 8 to about 8.8. The specific gravity of the primary slurry composition 24 is controlled to be about 1.3 or lower, preferably in a range of about 1.2 to about 1.3.

The primary slurry composition 24 is atomized in the presence of the gas stream 30 which may be fed into the primary scrubber 12 via a gas inlet 32. The atomized primary slurry composition 24 absorbs quantities of ammonia contained in the gas stream 30, forming a partially processed gas stream 34 as well as a further concentrated primary ammoniated slurry composition 36. The partially processed gas stream 34 exits the primary scrubber 12 via gas outlet 38, whereas the further concentrated primary ammoniated slurry composition 36 may be returned to the primary slurry feed system 16, as shown.

Significantly, the ammonia absorption process in the primary scrubber 12 is terminated before completion, i.e., before all (or substantially all) of the ammonia has been removed from the gas stream 30. In one embodiment of the invention, the absorption process is terminated when about 50-60% by volume of the ammonia has been removed from the gas stream 30. Also significantly, the absorption process occurring in the primary scrubber 12 operates in an ADM absorption mode, wherein the ammonia from the gas stream 30 combines with the molybdic acid in the primary slurry composition 24 to form primarily ammonium dimolybdate, $(NH_4)_2Mo_2O_7$ or "ADM".

The partially processed gas stream 34 from the first or primary scrubber 12 is then directed to the secondary scrubber 14, e.g., via a gas inlet 40 provided on secondary scrubber 14. The secondary slurry feed system 18 provides the secondary slurry composition 26 to the slurry atomizer 22 in the secondary scrubber 14. As was the case for the primary slurry composition 24, the secondary slurry composition 26 may comprise molybdic acid. The pH of the secondary slurry composition 26 is controlled to be generally greater than about 6, and more preferably in a range of about 6-6.8. The specific gravity of the secondary slurry composition 26 is controlled to be about 1.4 or lower, preferably in a range of about 1.3 to about 1.4. The atomized secondary slurry composition 26 absorbs additional quantities of ammonia remaining in the partially processed gas stream 34, forming a fully processed gas stream 42 and a further concentrated secondary ammoniated slurry composition 44. The fully processed gas stream 42 exits the secondary scrubber 14 via gas outlet 46, whereupon it may be vented to the atmosphere. The further concentrated secondary ammoniated slurry composition 44 may be returned to the secondary slurry feed system 18.

Unlike the absorption process in the primary scrubber 12, the absorption process in the secondary scrubber 14 operates in an AHM absorption mode, wherein the ammonia from the partially processed gas stream 34 combines with the molybdic acid in the secondary slurry composition 26 to form primarily ammonium heptamolybdate, $(NH_4)_6Mo_7O_{24}$ or "AHM", as opposed to ammonium dimolybdate. As will be described in much greater detail herein, the different absorption modes in the primary and secondary scrubbers 12 and 14 is due to the different pH levels of the primary and secondary slurry compositions 24 and 26 and provides significant operational and efficiency advantages.

In one embodiment, the primary slurry feed system 16 may be provided with a bleed outlet 48 to allow quantities of the primary slurry composition 24 to be withdrawn or bled from the primary slurry feed system 16. The withdrawn primary slurry composition 24 may be further combined with anhydrous ammonia 46 before being directed to an ammonia recovery system 52 as a feed liquor 54. Ammonia recovery system 52 removes the captured ammonia contained the feed liquor 54. The secondary slurry feed system 18 may be provided with a make-up outlet 56 that is operatively connected to the primary slurry feed system 16. The make-up outlet 56 allows quantities of the secondary slurry composition 26 to be added to the primary slurry feed system 16 to make up for the primary slurry composition 24 withdrawn from the bleed outlet 48 of the primary slurry feed system 16.

A significant advantage of the system and method of the present invention is that it provides a highly efficient means for recovering ammonia contained in gas streams without the material handling, clogging, and steam requirements of other types of ammonia recovery systems. For example, by selectively operating the scrubbers 12 and 14 in two different ammonia absorption modes, i.e., in the ADM absorption mode in the primary scrubber 12 and the AHM absorption mode in the secondary scrubber 14, the present invention avoids the formation of excessive precipitates in the primary and secondary slurry compositions, which can cause material handling, clogging, and filtering problems. For example, ammonium heptamolybdate, AHM, has a higher solubility in water than does ammonium dimolybdate. Consequently, the secondary slurry composition 26 is capable of absorbing the contained ammonia remaining in the partially processed gas stream 34 without the formation of significant precipitates. While ADM is has a lower solubility in water than does AHM, the lower specific gravity of the primary slurry composition 24 ameliorates the problems that would otherwise be associated with the build-up of excessive solids (i.e., precipitates) in the primary slurry compositions.

Still yet another advantage associated with the use of the ADM absorption mode in the primary scrubber 14 is that the preferential formation of ADM over AHM means that the primary slurry composition 24 is capable of absorbing, on an atomic basis, approximately double the amount of ammonia compared to what can be absorbed by the formation of AHM. Stated another way, the ADM absorption mode is particularly well-suited for use in the primary scrubber 12, wherein the amount of contained ammonia in the gas stream 30 is high. Similarly, the AHM absorption mode is well-suited for use in the secondary scrubber 14 in order to keep the vapor pressure of ammonia low and to avoid the formation of excessive solids in the secondary slurry composition 26.

Having briefly described various embodiments of the systems and methods of ammonia recovery according to the present invention, as well as some of the more significant attributes and advantages thereof, various preferred embodiments of the systems and methods of recovering ammonia will now be described in detail. However, before proceeding with the description it should be noted that neither the following description nor the claimed process should be regarded as restricted to any particular operational parameters, including reagent quantities, the order of reagent addition, reaction conditions, and other numerical values, unless otherwise indicated. Still further, it should be noted that specific reaction parameters and other operational factors may be optimized in a given situation, taking into account environmental factors, production-scale requirements, and the like, using routine preliminary pilot testing. The discussion provided herein involves one or more preferred embodiments which are designed to provide optimum results and shall not be considered limiting or restrictive.

With reference back now to FIG. 1, one embodiment of the ammonia recovery system 10 is shown and described herein as it could be used to recover ammonia contained in a gas stream 30 produced by a chemical processing plant. In the particular embodiment shown in FIG. 1, the gas stream 30 from the chemical processing plant is a combination of a calciner vent stream 58 and a tank vent stream 60. The calciner vent stream 58 is produced by a calcination process and typically comprises a mixture of air, water vapor, ammonia, and small amounts of carbon dioxide. The calciner vent stream 58 is provided at temperatures ranging from about 140° C. to about 150° C. (about 285-300° F.). The tank vent stream 60 is produced by a mixing tanks used in production and usually comprises a mixture of air, water vapor, and ammonia. The tank vent stream 60 is provided at temperatures ranging from about 27° C. to about 32° C. (about 80-90° F.). The resulting gas stream 30, i.e., resulting from combination of the calciner vent stream 58 and the tank vent stream 60, will generally comprise a mixture of air, water vapor, ammonia, and carbon dioxide at a temperature of about 96° C. (about 205° F.). The amount of ammonia in the gas stream 30 may range from about 0.5% by volume to about 5% by volume, with ammonia concentrations ranging from about 2% to about 3% by volume being typical. After being collected and combined, the gas stream 30 is fed into the gas inlet 32 of the primary scrubber 12.

As mentioned above, certain embodiments of the present invention may utilize two scrubbers, e.g., primary scrubber 12 and secondary scrubber 14 connected in a series arrangement. However, other embodiments may use additional scrubbers (i.e., 3 or more), either in series or in parallel arrangements, depending on a wide range of factors, as would become apparent to persons having ordinary skill in the art after having become familiar with the teachings provided herein. Consequently, the present invention should not be regarded as limited to embodiments using only two scrubbers.

The primary scrubber 12 may comprise a generally vertically oriented, elongated chamber having a slurry atomizer 20, a gas inlet 32, and a gas outlet 38, arranged substantially as shown in FIG. 1. The primary scrubber 12 may also be provided with a collection sump 62 suitable for collecting the further concentrated primary ammoniated slurry 36. If desired, the collection sump 62 may be provided with an agitator (not shown) to prevent settling and ensure a thorough dispersal of the solids in the further concentrated primary ammoniated slurry composition 36.

The secondary scrubber 14 may be similar to the primary scrubber 12 and may also comprise a generally vertically oriented, elongated chamber having a slurry atomizer 22, a gas inlet 40, and a gas outlet 46. The gas inlet 40 of secondary scrubber 14 may be connected to the gas outlet 38 of primary scrubber 12 so that the partially processed gas stream 34 from the primary scrubber 12 may be fed into the secondary scrubber 14. The gas outlet 46 from the secondary scrubber 14 may be vented to the atmosphere via a suitable blower assembly 64 and vent stack 66. The secondary scrubber 14 may also be provided with a collection sump 68 for collecting the further concentrated secondary ammoniated slurry 44. The collection sump 68 also may be provided with an agitator (not shown) to prevent settling and ensure a thorough dispersal of the solids in the further concentrated secondary ammoniated slurry composition 44.

The primary and secondary scrubbers 12 and 14 may be operatively connected to respective primary and secondary slurry feed systems 16 and 18. As briefly described above, the primary slurry feed system 16 provides a primary slurry composition 24 to the slurry atomizer 20 of the primary scrubber 12. Similarly, the secondary slurry feed system provides a secondary slurry composition 26 to the slurry atomizer 22 of the secondary scrubber 14. In addition, the primary and secondary slurry feed systems 16 and 18 may be configured to receive the further concentrated primary and secondary ammoniated slurry compositions 36 and 44 from the respective primary and secondary scrubbers 12 and 14, as best seen in FIG. 1.

In one embodiment, the primary slurry feed system 16 may comprise a primary tank 70 sized to receive a quantity of the primary slurry composition 24. The primary tank 70 may be provided with one or more agitator systems 72 to ensure a thorough dispersal of the solids in the primary slurry composition 24. A pump system 74 connected between the primary tank 70 and the slurry atomizer 20 in the primary scrubber 12 may be used to deliver the primary slurry composition 24 to the slurry atomizer 20. The primary tank 70 may also be provided with a level control system 76 which, in combination with valve 78, maintains the primary slurry composition 24 in primary tank 70 at the desired level.

As mentioned earlier, the primary slurry feed system may also be provided with bleed outlet 48 which allows quantities of the primary slurry composition 24 to be withdrawn from the primary slurry feed system 16. In one embodiment, the withdrawn slurry composition 24 may be directed to a surge tank for subsequent handling and ammonia removal, as will be described in greater detail below.

The primary slurry feed system 16 may also be provided with a pH control system 82 for controlling the pH of the primary slurry composition 24. The pH control system 82 may comprise a pH sensor 84 provided in the line connecting pump 74 and slurry atomizer 20. PH sensor 84 senses the pH of the primary slurry composition 24 being fed to the atomizer 20. A valve 86 may be positioned in the bleed outlet 48 and opened and closed as necessary to bleed off or remove quantities of the primary slurry composition 24 to control the pH of the primary slurry composition 24 in a manner that will be described in further detail below.

The primary slurry feed system 16 may also comprise an optional surge tank 88. The surge tank 88 may be connected to the primary tank 70 via a pump 90 and may be used to supply make-up quantities of the primary slurry composition 24 to the primary tank 70. In one embodiment, surge tank 88 may be configured to receive a supply of primary slurry composition 24 from a primary slurry source 92. Surge tank 88 also may be configured to receive quantities of the secondary slurry composition 26 from the make-up outlet 56 from secondary slurry feed system 18, as depicted in FIG. 1.

Surge tank 88 also may be provided with an agitator system 94 to ensure a thorough dispersal of the solids in the primary slurry composition 24.

The secondary slurry feed system 18 may be similar to the primary slurry feed system 16 and may comprise a secondary tank 96 sized to receive a quantity of the secondary slurry composition 26. The secondary tank 96 may be provided with an agitator 98 to ensure a thorough dispersal of the solids in the secondary slurry composition 26. A pump 11 may be connected between the secondary tank 96 and the slurry atomizer 22 in the secondary scrubber 14. Pump 11 delivers the secondary slurry composition 26 to the secondary scrubber 14 whereupon it is atomized by the slurry atomizer 22. The secondary tank 96 may also be provided with a level control system 13 which, in combination with valve 15 may be used to maintain the secondary slurry composition 26 in secondary tank 96 at the desired level.

The secondary slurry feed system 18 may be provided with make-up outlet 56 which allows quantities of the secondary slurry composition 26 to be withdrawn from the secondary slurry feed system 18 and fed to the primary slurry feed system 16. In the particular embodiment shown and described herein, the withdrawn slurry composition 26 may be directed to surge tank 88.

The secondary slurry feed system 18 may also be provided with a pH control system 17 for controlling the pH of the secondary slurry composition 26. The pH control system 17 may comprise a pH sensor 19 provided in the line connecting pump 11 and slurry atomizer 22. Sensor 19 senses the pH of the secondary slurry composition 26 being fed to the atomizer 22 of the secondary scrubber 14. A valve 21 positioned in the make-up outlet 54 may be opened and closed as necessary to bleed off or remove quantities of the secondary slurry composition 26 to control the pH of the secondary slurry composition 26.

The secondary slurry feed system 18 may also comprise an optional surge tank 23. The surge tank 23 may be connected to the secondary tank 96 via a pump 25 and may be used to supply make-up quantities of the secondary slurry composition 26 to the secondary tank 96. In one embodiment, surge tank 23 may be configured to receive a supply of secondary slurry composition 26 from a secondary slurry source 27. Surge tank 23 also may be configured to receive quantities of water (e.g., deionized water) 29, which may be used to control the specific gravity and/or pH of the respective slurries 24 and 26. Surge tank 23 may be provided with an agitator 31 to ensure a thorough dispersal of the solids in the secondary slurry composition 26.

As mentioned above, quantities of the primary slurry composition 24 that are bled from the primary slurry feed system 16 may be directed to a surge tank 80 for holding and/or additional processing before being sent to an ammonia recovery system 52 via pump 33. By way of example, in one embodiment, the ammonia recovery system 52 may comprise one or more filters and/or particle separation systems for removing (by filtering) any impurities that may be precipitated when the molybdic acid ($MoO_3$) is initially dissolved. ADM is crystallized from the ammonium molybdate solution and some of that solution left over is used along with excess water and ammonia collected during crystallization to dissolve additional amounts of $MoO_3$ for subsequent use in the scrubbers. Surge tank 80 may be provided with an agitator 35 and may also be connected to the supply of anhydrous ammonia 46. Anhydrous ammonia 46 may be added as necessary to form additional ammonium molybdates within the slurry 24, thereby enhancing the subsequent ammonia recovery process.

The system 10 may be operated in accordance with method 28 to remove ammonia contained in gas stream 30. As an initial matter, the primary and second slurry compositions 24 and 26 are provided to the respective primary and secondary slurry feed systems 16 and 18. In the particular embodiment shown and described herein, the primary slurry composition 24 may be provided by primary slurry source 92 from the chemical plant. The primary slurry composition 24 from the slurry source 92 is formed by mixing molybdenum trioxide ($MoO_3$) with water. The resulting molybdic acid will be quite acidic, having a pH in a range of about 2.2-2.3. To this mixture, ammonia ($NH_3$) may be added to increase the pH to the desired level. Sufficient water also may be added to achieve the desired specific gravity. Upon initial start-up, i.e., before the primary slurry feed system 16 contains the primary slurry composition 24, the primary slurry source 92 will be operated to provide the primary slurry composition 24 with the desired pH and specific gravity levels. Thereafter, the primary slurry source 92 may be operated to provide the primary slurry composition 24 with slightly different pH and specific gravity levels as the primary slurry 24 in the primary slurry feed system 16 will be intermixed with further concentrated primary ammoniated slurry 36 from the primary scrubber 12, as well as make-up quantities of the secondary slurry 26, as described.

By way of example, in the particular embodiment shown in FIG. 1, upon initial start-up, a primary slurry source 92 will be operated to provide the primary slurry 24 with a pH greater than about 7, preferably in a range of about 7 to about 9.5, and more preferably in a range of about 8 to about 8.8. Similarly, the specific gravity of the primary slurry composition 24 from the primary slurry source 92 will have a specific gravity of about 1.3 or lower, preferably in a range of about 1.2 to about 1.3.

Thereafter, once the system 10 has been operated for a period of time sufficient to reach equilibrium, the primary slurry source 92 may be operated to provide additional quantities of slurry at slightly different pH and specific gravity levels. By way of example, in one embodiment, the primary slurry source 92 may be operated to provide the slurry at a pH of about 6 and a specific gravity of about 1.4. Again, when mixed with the other slurry streams, i.e., the further concentrated primary ammoniated slurry 36 and make-up quantities of secondary slurry 26, the primary slurry composition 24 provided to the primary scrubber 12 will have pH and specific gravity levels within the ranges specified herein for steady state operation.

The initial quantities of the secondary slurry composition 26 may be provided in a similar manner. For example, in the particular embodiment shown in FIG. 1, the secondary slurry composition 26 may be provided by a secondary slurry source 27 also from the chemical plant. The secondary slurry composition 26 from the secondary slurry source 27 also may be formed by mixing molybdenum trioxide ($MoO_3$) with water, with ammonia added to increase the pH to the desired level. Sufficient water, e.g., from deionized water source 29 may also be added to achieve the desired specific gravity. However, and unlike the case for the primary slurry composition 24 from the primary slurry source 92, the secondary slurry source 27 may be operated to provide the secondary slurry composition 26 at the specific gravity and pH levels required during steady state operation. That is, it will typically not be necessary to provide the initial slurry amounts at different pH and/or specific gravity levels. Thus, in one embodiment, the secondary slurry composition 26 provided by the secondary slurry source 27 will have a pH of at least about 6 and preferably in a range of about 6 to about 6.8. The specific gravity of the secondary slurry 26 should be below about 1.4, and preferably in a range of about 1.3 to about 1.4. By way of example, during operation the secondary slurry source 27 will provide slurry having a pH of about 6 and a specific gravity of about 1.3.

Before proceeding with the description, it should be noted that the permissible specific gravity levels for the primary slurry composition 24 are related to temperature. Higher slurry temperatures will allow higher specific gravity levels to be used without problems due to excessive precipitation in the slurry composition. Conversely, lower slurry temperatures will require lower specific gravity levels in order to avoid problems due to excessive precipitation in the slurry. The specific gravity levels provided herein are suitable for primary slurry compositions 24 having temperatures in the range of about 54° C. to about 66° C. (about 130-150° F.).

Once sufficient quantities of the primary and secondary slurry compositions 24 and 26 have been provided, the system 10 is ready to begin removing ammonia from the gas stream 30. As mentioned above, in the particular embodiment shown and described herein the gas stream 30 is a combination of the calciner vent stream 58 and the tank vent stream 60. The calciner vent stream 58 is produced by a calcination process and comprises a mixture of air, water vapor, ammonia, and small amounts of carbon dioxide. The calciner vent stream 58 typically will be at a temperature ranging from about 140° C. to about 150° C. (about 285-300° F.). The tank vent stream 60 is produced by a mixing tanks used in production and comprises a mixture of air, water vapor, and ammonia. The tank vent stream 60 usually will be at a temperature ranging from about 27° C. to about 32° C. (about 80-90° F.).

The resulting gas stream 30, i.e., resulting from combination of the calciner vent stream 58 and the tank vent stream 60, will generally comprise a mixture of air, water vapor, ammonia, and carbon dioxide at a temperature of about 96° C. (about 205° F.). The amount of ammonia in the gas stream 30 may range from about 0.5% by volume to about 5% by volume, with ammonia concentrations ranging from about 2% to about 3% by volume being typical. After being collected and combined, the gas stream 30 is fed into the gas inlet 32 of the primary scrubber 12.

Once in the primary scrubber 12, the gas stream 30 will contact the primary slurry composition 24 being discharged by the slurry atomizer 20. In one embodiment, the pump 74 will provide the primary slurry 24 at a flow rate and pressure sufficient to cause the slurry 24 to be discharged at a differential pressure of about 0.69 bar (about 10 pounds per square inch, differential (psid)), which is sufficient to provide good atomization of the primary slurry 24 with the particular slurry atomizer 20. As the atomized primary slurry 24 contacts the gas stream 30, ammonia in the gas stream 30 will combine with the molybdic acid in the primary slurry 24. As already mentioned, at the particular elevated pH levels of the primary slurry composition (i.e., at a pH of at least about 7), the ammonia will combine with the molybdic acid to form primarily ammonium dimolybdate, $(NH_4)_2Mo_2O_7$ or ADM, although other ammonium molybdates may also be formed, but to a much lesser degree. The resulting further concentrated primary ammoniated slurry 36 will collect in the sump 62 of primary scrubber 12, whereupon it will be returned to primary tank 70 of the primary slurry feed system 16.

The ammonia absorption process in the primary scrubber 12 is terminated before completion, i.e., before all (or even before substantially all) of the ammonia has been removed from the gas stream 30. The absorption process may be terminated when about 50% by volume to about 60% by volume of the ammonia has been removed from the gas stream 30. Thus, in an embodiment wherein the gas stream 30 contains about 2% by volume ammonia, the resulting partially processed gas stream 34 will contain about 0.2% by volume ammonia.

The partially processed gas stream 34 from the primary scrubber 12 is next directed to the secondary scrubber 14. The secondary slurry feed system 18 provides the secondary slurry composition 26 to the slurry atomizer 22 in the secondary scrubber 14. In one embodiment, pump 11 provides the secondary slurry 26 at a flow rate and pressure sufficient to cause the slurry 26 to be discharged from the atomizer 22 at a differential pressure of about 0.69 bar (about 10 pounds per square inch, differential (psid)), which is sufficient to provide good atomization of the secondary slurry composition 26 with the particular slurry atomizer 22 involved.

Like the primary slurry composition 24, the secondary slurry composition 26 comprises molybdic acid. However, the pH of the secondary slurry composition 26 is controlled to be generally greater than about 6, and more preferably in a range of about 6-6.8. The specific gravity of the secondary slurry composition 26 is controlled to be about 1.4 or lower, preferably in a range of about 1.3 to about 1.4 at secondary slurry temperatures ranging from about 54° C. to about 66° C. (about 130-150° F.). Higher secondary slurry temperatures will allow higher specific gravity levels to be used, whereas lower secondary slurry temperatures will generally require lower specific gravity levels in order to avoid problems due to excessive precipitation in the secondary slurry composition 26.

The atomized secondary slurry composition 26 absorbs additional quantities of ammonia remaining in the partially processed gas stream 34, forming a fully processed gas stream 42 and a further concentrated secondary ammoniated slurry composition 44. The fully processed gas stream 42 exits the secondary scrubber 14 via gas outlet 46, whereupon it may be vented to the atmosphere via blower 60 and vent stack 66. The further concentrated secondary ammoniated slurry composition 44 may be returned to the secondary slurry feed system 18.

The absorption process in the secondary scrubber 14 operates in an AHM absorption mode, wherein the ammonia from the partially processed gas stream 34 combines with the molybdic acid in the secondary slurry composition 26 to form primarily ammonium heptamolybdate, $(NH_4)_6Mo_7O_{24}$ or "AHM", as opposed to ammonium dimolybdate. Other types of ammoniated molybdates may also be formed, but to a much lesser degree than AHM.

In one embodiment, the secondary scrubber 14 removes about 75% by volume to about 80% by volume of the ammonia contained in the partially processed gas stream 34. Accordingly, in an embodiment wherein the gas stream 30 contains about 2% by volume ammonia the partially processed gas stream 34 will contain about 0.2% by volume ammonia, whereas the fully processed gas stream 42 will contain only about 300 parts per million by volume (ppmv) ammonia.

As briefly described above, the primary and secondary slurry feed systems 16 and 18 are interconnected, with the secondary slurry feed system 18 providing slurry (e.g., via make-up outlet 56) to the primary slurry feed system 16 to make up for primary slurry withdrawn from the bleed outlet 48. This arrangement provides for enhanced control of pH and specific gravity, and also reduces the slurry delivery requirements for the primary and secondary slurry feed sources 92 and 27.

More specifically, as the ammonia from the gas stream 30 is absorbed in the primary scrubber 12, the pH and specific gravity of the primary slurry composition 24 gradually increases, i.e., due to the return of the further concentrated primary ammoniated slurry 36 from primary scrubber 12. As the pH increases, the pH control system 82 will open valve 86 to withdraw or bleed off some of the primary slurry composition 24, whereupon it will be fed to surge tank 80 for subsequent recovery of the ammonia contained therein. The slurry required to make up or replace the withdrawn primary slurry 24 may come from the secondary slurry feed system 18 via surge tank 88. Additional quantities of make-up slurry may also come from the primary slurry source 92 as well. In any event, since the pH of the replacement slurry compositions will be lower than the pH of the primary slurry composition 24, the addition of the replacement slurry compositions will help maintain the pH of the primary slurry composition 24 at the desired level.

As mentioned earlier, the primary slurry feed system 16 may also be provided with a level control system 76. Level control system 76 may be used to control the slurry level in tank 70 by opening valve 78 to allow additional amounts of slurry 24 from surge tank 88 to be pumped into the primary tank 70. In this regard, the level control system 76, functioning together with the pH control system 82 operate as a specific gravity control system and may be operated to also control the specific gravity of the primary slurry composition 24. More specifically, a high pH or tank level condition will cause valve 86 to open, thereby dropping the level of the slurry 24 in tank 70. A high specific gravity will trigger the addition of makeup water or aqua ammonia to the system (e.g., via water source 29 and/or slurry sources 92 and 27). A low slurry level in tank 70 will trigger the addition of additional slurry from the surge tank 88.

The secondary slurry feed system 18 is similar to the primary feed system 16, with the exception that additional slurry and/or water is provided by the slurry and water sources 27 and 29 via surge tank 23. As the ammonia from the partially processed gas stream 34 is absorbed in the secondary scrubber 14, the pH and specific gravity of the secondary slurry composition 26 will gradually increase due to the return of the further concentrated secondary ammoniated slurry 44 from secondary scrubber 14. As the pH increases, the pH control system 17 will open valve 21 to withdraw some of the secondary slurry composition 26 and feed it via surge tank 88 to the primary slurry feed system 16. The slurry required to make up or replace the withdrawn secondary slurry 26 may come from the secondary slurry source 27 via surge tank 23. Since the pH of the replacement slurry will be lower than the pH of the (now further concentrated) secondary slurry composition 26, the addition of the replacement slurry will help maintain the pH of the secondary slurry composition 26 at the desired level.

As was the case for the primary slurry feed system 16, the secondary slurry feed system 18 may be provided with a level control system 13. Level control system 13 may be used to control the slurry level in tank 96 by opening valve 15 to allow additional amounts of slurry 26 from surge tank 23 to be pumped into the secondary tank 96. The level control system 13, functioning together with the pH control system 17 may be operated as a specific gravity control system to also control the specific gravity of the secondary slurry composition 26. More specifically, a high pH or tank level condition will cause valve 21 to open, thereby dropping the level of the slurry 26 in tank 96. A high specific gravity will trigger the addition of makeup aqua ammonia or water to the system (e.g., via water source 29). A low slurry level in tank 96 will trigger the addition of additional slurry from the surge tank 23.

The ammonia captured by the primary and secondary slurry compositions 24 and 26 may be recovered by an ammonia recovery system 52. In one embodiment, ammonia recovery system 52 may comprise a Hoesch-type filtering system which removes any impurities from the withdrawn slurry. More specifically, quantities of the primary slurry composition 24 that are bled from the primary slurry feed system 16 may be directed to surge tank 80 for holding and/or additional processing before being sent to ammonia recovery system 52 via pump 33. Surge tank 80 may be provided with an agitator 35 and may also be connected to the supply of anhydrous ammonia 46. Anhydrous ammonia 46 may be sparged into surge tank 80 in order to increase the ammonia concentration in the slurry to that required by the subsequent filter recovery process.

As mentioned above, other arrangements and configurations of the ammonia recovery system are possible. For example, a second embodiment 110 of an ammonia recovery system may involve the integration or combination of various components in order to simplify the overall system and streamline operation.

Figure 2:
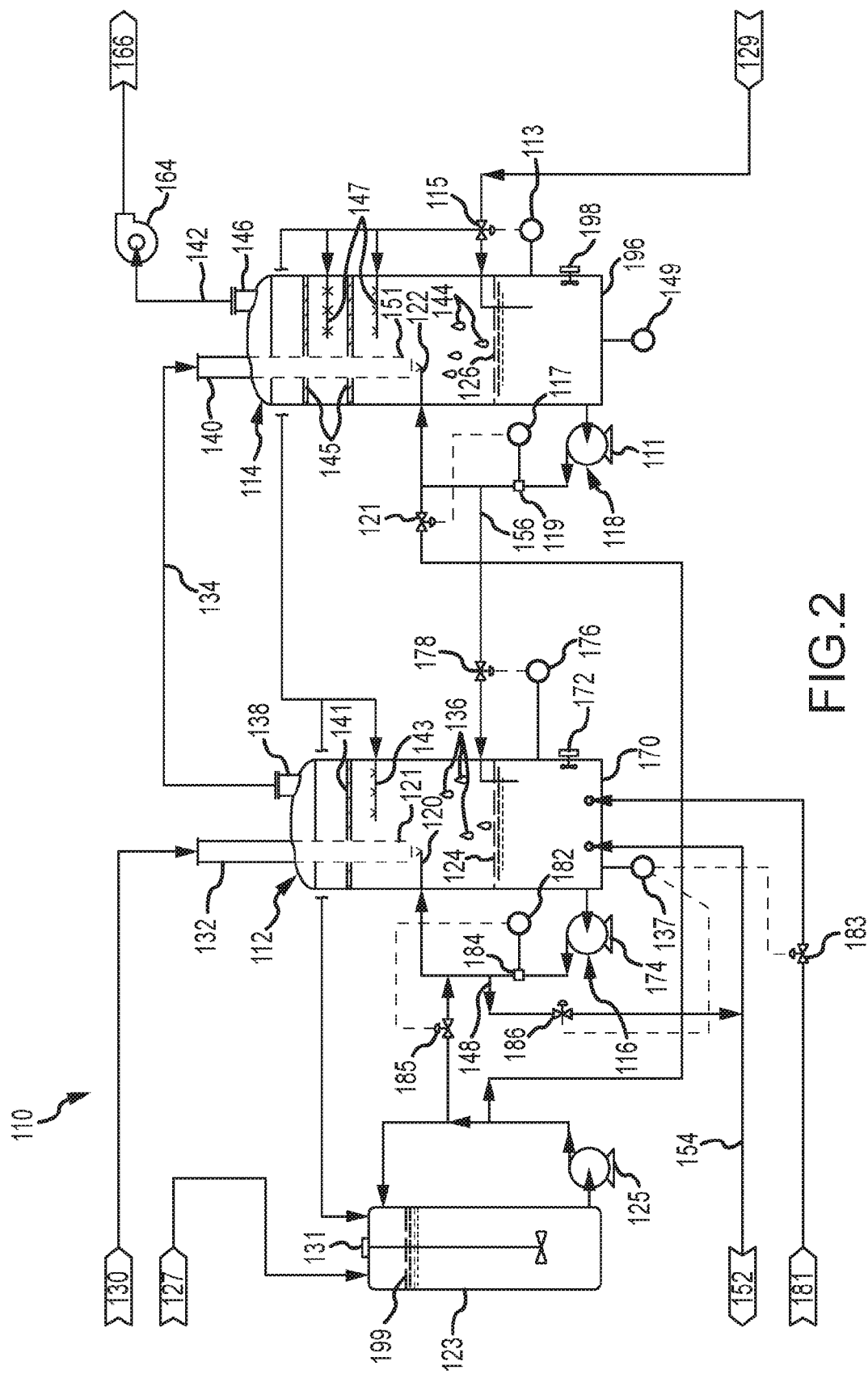
FIG. 2 is a schematic representation of a second embodiment of an ammonia recovery system.

With reference now primarily to FIG. 2, the second embodiment 110 may comprise a first or primary scrubber 112 and a secondary scrubber 114 that are operatively associated with respective primary and secondary slurry feed systems 116 and 118. The primary slurry feed system 116 may be operatively connected to a slurry atomizer 120 provided within the primary scrubber 112, whereas the secondary slurry feed system 118 may be operatively connected to a slurry atomizer 122 provided within secondary scrubber 114. The primary and secondary slurry feed systems 116 and 118 feed respective primary and secondary slurry compositions 124 and 126 to the respective atomizers 120 and 122. The primary and secondary slurry compositions 124 and 126 may comprise molybdic acid, but at different pH and specific gravity levels, as already described for the first embodiment 10.

The second embodiment 110 also may be used to remove ammonia contained in a gas stream 130 produced by a chemical processing plant. Gas stream 130 may result from the combination of a calciner vent stream and a tank vent stream, neither of which is specifically illustrated in FIG. 2, but which may involve the same arrangement as that illustrated in FIG. 1. That is, gas stream 130 of the second embodiment 110 will generally comprise a mixture of air, water vapor, ammonia, and carbon dioxide at a temperature of about 96° C. (about 205° F.). The amount of ammonia in the gas stream 130 may range from about 0.5% by volume to about 5% by volume, with ammonia concentrations ranging from about 2% to about 3% by volume being typical. After being collected and combined, the gas stream 130 is fed into the gas inlet 132 of primary scrubber 112.

The primary scrubber 112 may comprise a generally vertically oriented, elongated chamber having gas inlet 132 and a gas outlet 138. In the second embodiment 110, the gas inlet 132 may comprise a generally elongated, tube-like structure in which the atomizer 120 is positioned at about a distal end 121 of inlet 132, as best seen in FIG. 2. This arrangement provides for enhanced and more efficient mixing of the inlet gas stream 130 and primary slurry composition 124. In the FIG. 2 embodiment, the collection sump and primary tank (e.g., 62 and 70) of the first embodiment 10 are combined or integrated to form a primary slurry tank 170 defined by the bottom portion of primary scrubber 112. Primary slurry tank 170 contains the primary slurry composition 124 and also receives and collects further concentrated primary ammoniated slurry 136 formed in primary scrubber 112. In the second embodiment 110, primary slurry tank 170 may also be provided with an agitator 172 to prevent settling and ensure a thorough dispersal of the solids in the primary slurry composition 124. Primary scrubber 112 may also be provided with a demister 141 to remove quantities of liquid or mist contained in the partially processed gas stream 134 before it exits primary scrubber 112, i.e., via gas outlet 138. Primary scrubber 112 may also be provided with a cleaning system 143 which may be operated from time-to-time to spray water 129 on demister 141 to prevent clogging thereof.

Secondary scrubber 114 may be similar to the primary scrubber 112 and may also comprise a generally vertically oriented, elongated chamber having a gas inlet 140 and a gas outlet 146. The gas inlet 140 of secondary scrubber 114 may be connected to the gas outlet 138 of primary scrubber 112 so that the partially processed gas stream 134 from the primary scrubber 112 may be fed into the secondary scrubber 114. As was the case for primary scrubber 112, gas inlet 140 of secondary scrubber 114 may comprise a generally elongated, tube-like structure in which the atomizer 122 is positioned at about a distal end 151 of inlet 140. This arrangement provides for enhanced and more efficient mixing of the partially processed gas stream 134 and secondary slurry composition 126. The gas outlet 146 from the secondary scrubber 114 may be vented to the atmosphere via a suitable blower assembly 164 and vent stack 166.

The secondary scrubber 114 may also comprise a combined or integrated arrangement in which the sump and secondary slurry tank (e.g., 68 and 96) of the first embodiment 10 are combined to form a single secondary tank 196 defined by the bottom portion of secondary scrubber 114. The combined secondary tank 196 holds the secondary slurry composition 126 and also collects further concentrated secondary ammoniated slurry 144 formed in secondary scrubber 114. Secondary tank 196 may be provided with an agitator 198 to prevent settling and ensure a thorough dispersal of the solids in the secondary slurry composition 126. Secondary scrubber 114 may also be provided with one or more demisters 145 to remove quantities of liquid or mist contained in the fully processed gas stream 142 before it exits secondary scrubber 114 via gas outlet 146. Secondary scrubber 114 may also be provided with a cleaning system 147 which may be operated from time-to-time to spray water 129 on demisters 145 to prevent clogging thereof.

As briefly described above, the primary and secondary scrubbers 112 and 114 may be operatively connected to respective primary and secondary slurry feed systems 116 and 118. Primary slurry feed system 116 provides the primary slurry composition 124 to the slurry atomizer 120 of the primary scrubber 112. Similarly, the secondary slurry feed system 118 provides the secondary slurry composition 126 to the slurry atomizer 122 of the secondary scrubber 114.

More specifically, primary slurry feed system 116 may comprise a pump system 174 connected between the primary tank 170 and the slurry atomizer 120 in the primary scrubber 112. Pump 174 delivers the primary slurry composition 124 to the slurry atomizer 120 under sufficient pressure to provide good atomization. Primary tank 170 may also be provided with a level control system 176 which, in combination with valve 178, may be used to maintain the primary slurry composition 124 in primary tank 170 at the desired level.

The primary slurry feed system 116 may be connected to a reagent tank 123 via a pump 125. Reagent tank 123 supplies quantities of a make-up slurry composition 199 to primary and secondary tanks 170 and 196. In one embodiment, reagent tank 123 may be configured to receive a supply of make-up slurry composition 199 from a slurry source 127. Reagent tank 123 also may be configured to receive water (e.g., deionized water) 129, which may be used to control the specific gravity and/or pH of the make-up slurry composition 199. Reagent tank 123 also may be provided with an agitator system 131 to ensure a thorough dispersal of the solids in the make-up slurry composition 199.

Primary slurry feed system 116 may also comprise a bleed outlet 148 which allows quantities of the primary slurry composition 124 to be withdrawn from the primary slurry feed system 116. The withdrawn slurry composition 124 may be directed to an ammonia recovery system 152 for subsequent handling and ammonia removal, as will be described in greater detail below.

The primary slurry feed system 116 may also be provided with a pH control system 182 for controlling the pH of the primary slurry composition 124. The pH control system 182 may comprise a pH sensor 184 provided in the line connecting pump 174 and slurry atomizer 120. PH sensor 184 senses the pH of the primary slurry composition 124 being fed to atomizer 120. A valve 185 positioned in feed line from reagent tank 123 may be opened and closed as necessary to add additional quantities of make-up slurry composition 199 to control the pH of the primary slurry composition 124. Additional quantities of make-up slurry composition 199 will reduce or lower the pH of the slurry composition 124.

Primary slurry feed system 116 may also be provided with a density control system 137 to control the density of the primary slurry composition 124 contained within primary tank 170. Density control system 137 may comprise a density meter, such as a Coriolis density meter (not shown), and may be operatively connected to valves 183 and 186. The density is lowered by opening valve 186, thereby increasing the flow rate of primary slurry composition 124 to the ammonia recovery system 152. Density control system 137 may also operate valve 183 to control the flow of aqueous ammonia 181 into primary tank 170, thereby providing further control over the density of the primary slurry composition 124.

The secondary slurry feed system 118 may be similar to the primary slurry feed system 116. Secondary slurry feed system 118 may comprise a pump 111 connected between the secondary tank 196 and the slurry atomizer 122 in the secondary scrubber 114. Pump 111 delivers the secondary slurry composition 126 to the secondary scrubber 114 whereupon it is atomized by the slurry atomizer 122. The secondary slurry feed system 118 may be provided with make-up outlet 156 which allows quantities of the secondary slurry composition 126 to be withdrawn from the secondary slurry feed system 118 and fed to the primary slurry feed system 116 via primary tank 170. Secondary tank 196 may be provided with a level control system 113 which, in combination with valve 115, may be used to maintain the secondary slurry composition 126 in secondary tank 196 at the desired level.

The secondary slurry feed system 118 may also be provided with a pH control system 117 for controlling the pH of the secondary slurry composition 126. The pH control system 117 may comprise a pH sensor 119 provided in the line connecting pump 111 and slurry atomizer 122. Sensor 119 senses the pH of the secondary slurry composition 126 being fed to the atomizer 122 of the secondary scrubber 114. A valve 121 connected to pump 125 of reagent tank 123 may be opened and closed as necessary to add additional quantities of the make-up slurry composition 199 to control the pH of the secondary slurry composition 126.

The density of the secondary slurry composition 126 may be monitored by a density monitoring system 149. Density monitoring system 149 may comprise a density meter, such as a Coriolis density meter (not shown), and may be used to obtain an indication of the density of the secondary slurry composition 126 contained in secondary tank 196. In the second embodiment 110, the density or specific gravity of the secondary slurry composition may be indirectly controlled via the level control system 113, i.e., by adding additional quantities of water 129 to secondary tank 196.

As mentioned above, quantities of the primary slurry composition 124 that are bled from the primary slurry feed system 116 may be directed to an ammonia recovery system 152. As was the case for the first embodiment 10, the ammonia recovery system 152 of the second embodiment 110 may comprise one or more filters and/or particle separation systems for removing (by filtering) any impurities that may be contained in feed liquor 154.

Finally, second embodiment 110 may also be connected to a supply of aqueous ammonia 181. More specifically, the supply of aqueous ammonia 181 may be connected to tank 170 via valve assembly 183. Aqueous ammonia 181 may be used to provide further control of the specific gravity and/or pH of the primary slurry composition 124.

Figure 3:
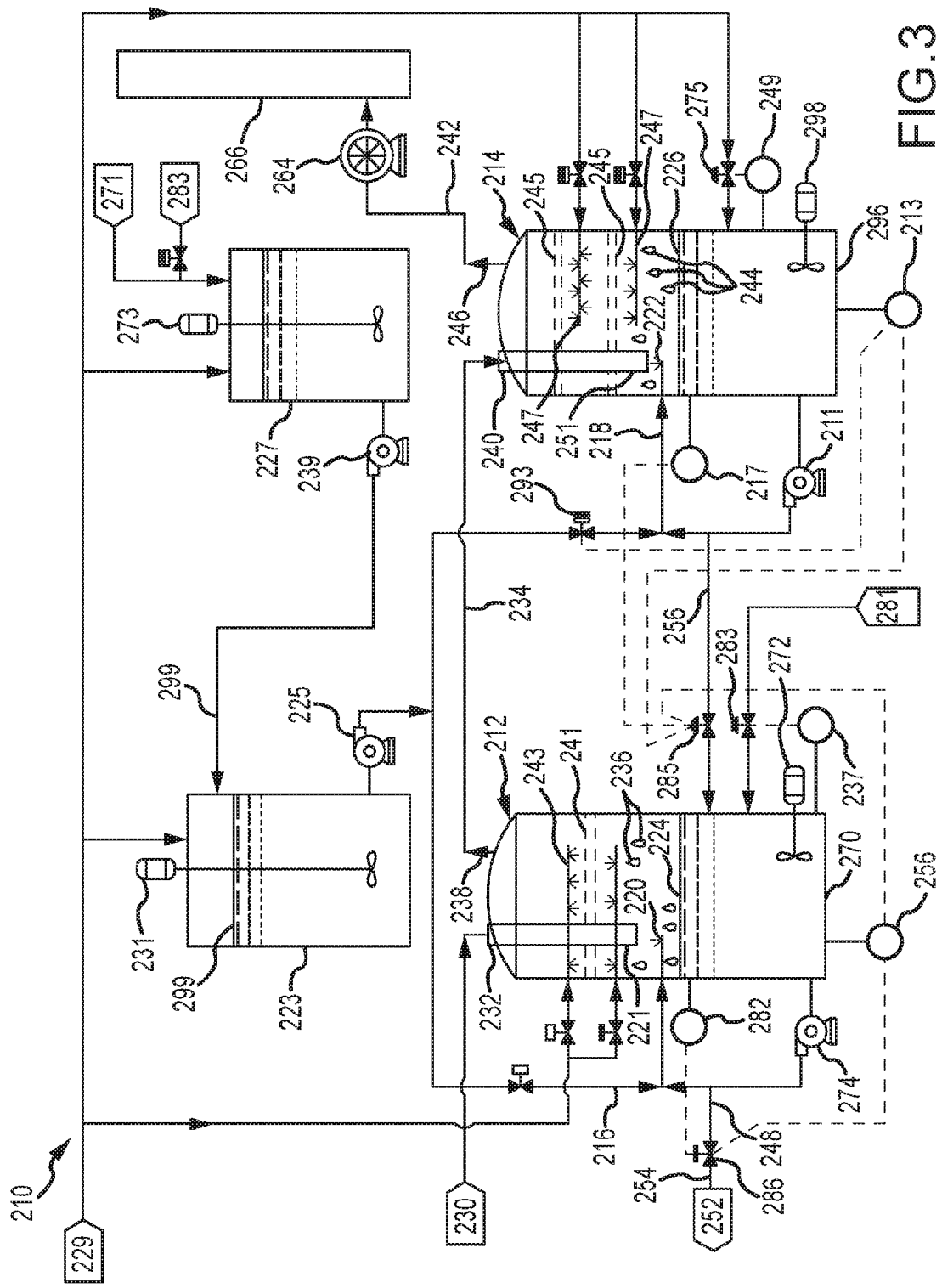
FIG. 3 is a schematic representation of a third embodiment of an ammonia recovery system.

A third embodiment 210 of an ammonia recovery system is illustrated in FIG. 3 and may involve yet other integrations and combinations of various components in order to simplify the overall system and otherwise streamline operation. The third embodiment 210 may also be provided with a recycle tank 227 for preparing additional quantities of a make-up slurry composition 299.

Referring now to FIG. 3, with occasional reference to FIGS. 1 and 2 as required, third embodiment 210 may comprise a first or primary scrubber 212 and a secondary scrubber 214. Primary and secondary scrubbers 212 and 214 may be operatively associated with respective primary and secondary slurry feed systems 216 and 218. The primary slurry feed system 216 may be operatively connected to a slurry atomizer 220 provided within the primary scrubber 212. Secondary slurry feed system 218 may be operatively connected to a slurry atomizer 222 provided within secondary scrubber 214. The primary and secondary slurry feed systems 216 and 218 feed respective primary and secondary slurry compositions 224 and 226 to the respective atomizers 220 and 222. As already described for the first and second embodiments 10 and 110, the primary and secondary slurry compositions 224 and 226 may comprise molybdic acid, but at different pH and specific gravity levels.

The third embodiment 210 may be used to remove ammonia contained in a gas stream 230 produced by a chemical processing plant. Gas stream 230 may result from the combination of a calciner vent stream and a tank vent stream, neither of which is specifically illustrated in FIG. 3, but which may involve the same arrangement as that illustrated in FIG. 1. As was the case for the FIG. 1 embodiment, the gas stream 230 of the third embodiment 210 will generally comprise a mixture of air, water vapor, ammonia, and carbon dioxide at compositions and temperatures already described for the first two embodiments 10 and 110.

After being collected and combined, the gas stream 230 is fed into the gas inlet 232 of primary scrubber 212.

The primary scrubber 212 may be substantially identical to primary scrubber 112 for the second embodiment 110 and may comprise a generally vertically oriented, elongated chamber having a gas inlet 232 and a gas outlet 238. Gas inlet 232 may comprise a generally elongated, tube-like structure in which the atomizer 220 is positioned at about a distal end 221 of inlet 232, as best seen in FIG. 3. This arrangement provides for enhanced and more efficient mixing of the inlet gas stream 230 and primary slurry composition 224. Primary scrubber 212 may also comprise a primary slurry tank 270 defined by the bottom portion of primary scrubber 212.

Primary slurry tank 270 contains the primary slurry composition 224 and also receives and collects further concentrated primary ammoniated slurry 236 formed in primary scrubber 212. Primary slurry tank 270 may also be provided with an agitator 272 to prevent settling and ensure a thorough dispersal of the solids in the primary slurry composition 224. Primary scrubber 212 may also be provided with a demister 241 to remove quantities of liquid or mist contained in the partially processed gas stream 234 before it exits primary scrubber 212 via gas outlet 238. In one embodiment, primary scrubber 212 may also be provided with a cleaning system 243 which may be operated from time-to-time to spray water 229 on demister 241 to prevent clogging thereof.

Secondary scrubber 214 may also comprise a generally vertically oriented, elongated chamber having a gas inlet 240 and a gas outlet 246. The gas inlet 240 of secondary scrubber 214 may be connected to the gas outlet 238 of primary scrubber 212 so that the partially processed gas stream 234 from the primary scrubber 212 may be fed into the secondary scrubber 214. Gas inlet 240 of secondary scrubber 214 may comprise a generally elongated, tube-like structure in which the atomizer 222 is positioned at about a distal end 251 of inlet 240. This arrangement provides for enhanced and more efficient mixing of the partially processed gas stream 234 and secondary slurry composition 226. The gas outlet 246 from the secondary scrubber 214 may be vented to the atmosphere via a suitable blower assembly 264 and vent stack 266.

The secondary scrubber 214 may also comprise a combined or integrated arrangement in which the sump and secondary slurry tank are combined to form a single secondary tank 296 defined by the bottom portion of secondary scrubber 214. The combined secondary tank 296 holds the secondary slurry composition 226 and also collects further concentrated secondary ammoniated slurry 244 formed in secondary scrubber 214. Secondary tank 296 may be provided with an agitator 298 to prevent settling and ensure a thorough dispersal of the solids in the secondary slurry composition 226. Secondary scrubber 214 may also be provided with two demisters 245 to remove quantities of liquid or mist contained in the fully processed gas stream 242 before it exits secondary scrubber 214 via gas outlet 246. Secondary scrubber 214 may also be provided with a cleaning system 247 which may be operated from time-to-time to spray water 229 on demisters 245 to prevent clogging thereof.

As briefly mentioned above, the primary and secondary scrubbers 212 and 214 may be operatively connected to respective primary and secondary slurry feed systems 216 and 218. Primary slurry feed system 216 provides primary slurry composition 224 to the slurry atomizer 220 of the primary scrubber 212. The secondary slurry feed system 218 provides a secondary slurry composition 226 to the slurry atomizer 222 of the secondary scrubber 214.

Primary slurry feed system 216 may comprise a pump system 274 connected between the primary tank 270 and the slurry atomizer 220 in the primary scrubber 212. Pump system 274 may be used to deliver the primary slurry composition 224 to the slurry atomizer 220. A bleed outlet 248 allows quantities of the primary slurry composition 224 to be withdrawn from the primary slurry feed system 216. The withdrawn slurry composition 224 may be directed to an ammonia recovery system 252 for subsequent handling and ammonia removal.

As was the case for the first two embodiments 10 and 110, primary tank 270 may also be provided with a level control system 276 to maintain the primary slurry composition 224 in primary tank 270 at the desired level. In the embodiment illustrated in FIG. 3, the level control system 276 maintains the level of the primary slurry composition 224 in primary tank 270 by operating valves 286 and 285, i.e., to bleed primary slurry composition 224 from primary tank 270 or add secondary slurry composition 226 to primary tank 270 as necessary.

The primary slurry feed system 216 may also be provided with a pH control system 282 for controlling the pH of the primary slurry composition 224. The pH control system 282 may be substantially identical to the pH control systems 82, 182 of the first and second embodiments 10 and 110. In the FIG. 3 embodiment, the pH control system 282 maintains the pH of the primary slurry composition 224 by operating valve 286 to bleed primary slurry composition 224 from primary tank 270.

Primary slurry feed system 216 may also be provided with a density control system 237 to control the density of the primary slurry composition 224 contained within primary tank 270. Density control system 237 may comprise a density meter, such as a Coriolis density meter (not shown). Density control system 237 also may be operatively connected to valve 283. Density control system 237 operates valve 283 to control the flow of aqueous ammonia 281 into primary tank 270.

The primary slurry feed system 216 may be connected to a reagent tank 223 via a pump 225. Reagent tank 223 supplies quantities of a make-up slurry composition 299 to primary and secondary tanks 270 and 296. In one embodiment, reagent tank 223 may be configured to receive a supply of make-up slurry composition 299 from a recycle tank 227. Reagent tank 223 also may be configured to receive water (e.g., deionized water) 229, which may be used to control the specific gravity and/or pH of the make-up slurry composition 299. Reagent tank 223 also may be provided with an agitator system 231 to ensure a thorough dispersal of the solids in the make-up slurry composition 299.

Recycle tank 227 may be used to prepare quantities of make-up slurry composition 299 that may be fed to reagent tank 223 via pump 239. In the particular embodiment shown in FIG. 3, recycle tank 227 may be connected to water supply 229, a dry feedstock elevator 271, and a supply of aqua ammonia (i.e., ammonium hydroxide) slurry 283. A suitable dry feed from feedstock elevator 271 may comprise molybdenum oxide. Recycle tank 227 may also be provided with an agitator or mixer 273 to assist in mixing the various constituents to form the make-up slurry composition 299.

The secondary slurry feed system 218 may be similar to the primary slurry feed system 216 and may comprise a pump 211 connected between the secondary tank 296 and the slurry atomizer 222. Pump 211 delivers the secondary slurry composition 226 to the secondary scrubber 214 whereupon it is atomized by the slurry atomizer 222. The secondary slurry feed system 218 may be provided with make-up outlet 256 which allows quantities of the secondary slurry composition 226 to be withdrawn from the secondary slurry feed system 218 and fed to the primary slurry feed system 216 via primary tank 270.

Secondary slurry feed system 218 may also be provided with a level control system 213 to maintain the secondary slurry composition 226 at the desired level within secondary tank 296. In the third embodiment 210, the level control system 213 maintains the level of the secondary slurry composition 226 in secondary tank 296 by operating valves 285 and 293, i.e., to bleed secondary slurry composition 226 from secondary tank 296 or add make-up slurry 299 from reagent tank 223 as necessary.

The secondary slurry feed system 218 may also be provided with a pH control system 217 for controlling the pH of the secondary slurry composition 226. The pH control system 217 may be substantially identical to the pH control systems 17 and 117 of the first and second embodiments 10 and 110. In the embodiment illustrated in FIG. 3, the pH control system 217 maintains the pH of the secondary slurry composition 226 by operating valve 285 to bleed secondary slurry composition 226 from secondary tank 296.

The density of the secondary slurry composition 226 may be controlled via a density control system 242. Density control system 242 may comprise a density meter, such as a Coriolis density meter (not shown) and may be operatively connected to valve 275. Density control system 242 operates valve 275 to control the flow of water 229 into secondary tank 296.

As mentioned above, quantities of the primary slurry composition 224 that are bled from the primary slurry feed system 216 (i.e., via bleed outlet 248) may be directed to an ammonia recovery system 252 as a feed liquor 254. As was the case for the first two embodiments 10 and 110, the ammonia recovery system 252 of the third embodiment 210 may comprise one or more filters and/or particle separation systems for removing (by filtering) any impurities that may be contained in feed liquor 254.

Having herein set forth preferred embodiments of the present invention, it is anticipated that suitable modifications can be made thereto which will nonetheless remain within the scope of the invention. The invention shall therefore only be construed in accordance with the following claims.

The invention claimed is:

1. Apparatus for removing ammonia from a gas stream, comprising:
   a primary scrubber having a gas inlet, a gas outlet, and a slurry atomizer, the gas inlet of said primary scrubber being operatively connected to the gas stream having ammonia contained therein;
   a primary slurry tank holding a supply of a primary slurry composition, the primary slurry composition comprising molybdic acid at a pH level;
   a primary slurry feed system operatively connected to the slurry atomizer of said primary scrubber and to said primary slurry tank, said primary slurry feed system feeding to the slurry atomizer the primary slurry composition;
   a secondary scrubber having a gas inlet, a gas outlet, and a slurry atomizer, the gas inlet of said secondary scrubber being operatively connected to the gas outlet of said primary scrubber;
   a secondary slurry tank holding a supply of a secondary slurry composition, the secondary slurry composition comprising molybdic acid at a pH level, the pH level of the secondary slurry composition being lower than the pH level of the primary slurry composition;

a secondary slurry feed system operatively connected to the slurry atomizer of the secondary scrubber and to said secondary slurry tank, said secondary slurry feed system feeding to the slurry atomizer the secondary slurry composition, said apparatus for removing ammonia atomizing the primary slurry composition in the primary scrubber, the atomized primary slurry composition absorbing quantities of ammonia contained in the gas stream to produce a partially processed gas stream, the partially processed gas stream exiting said primary scrubber via the gas outlet and entering said secondary scrubber via the gas inlet, said apparatus for removing ammonia atomizing the secondary slurry composition in the secondary scrubber, the atomized secondary slurry absorbing additional quantities of ammonia contained in the partially processed gas stream to produce a processed gas stream, the processed gas stream exiting said secondary scrubber via the gas outlet.

2. The apparatus of claim 1, wherein said primary slurry feed system comprises a bleed outlet, said bleed outlet allowing quantities of the primary slurry composition to be withdrawn from said primary slurry feed system.

3. The apparatus of claim 2, wherein said secondary slurry feed system comprises a make-up outlet operatively connected to said primary slurry feed system, said make-up outlet allowing quantities of the secondary slurry composition to be withdrawn from said secondary slurry feed system and added to said primary slurry feed system.

4. The apparatus of claim 1, further comprising:

a primary pH control system operatively associated with said primary slurry feed system, said primary pH control system controlling the pH level of said primary slurry composition; and a secondary pH control system operatively associated with said secondary slurry feed system, said secondary pH control system controlling the pH level of said secondary slurry composition.

5. The apparatus of claim 4, wherein said primary pH control system maintains the primary slurry composition at a pH level of at least about 7 and wherein said secondary pH control system maintains secondary slurry composition at a pH level of at least about 6.

6. The apparatus of claim 1, further comprising:

a primary specific gravity control system operatively associated with said primary slurry feed system, said primary specific gravity control system controlling a specific gravity of said primary slurry composition; and a secondary specific gravity control system operatively associated with said secondary slurry feed system, said secondary specific gravity control system controlling a specific gravity of said secondary slurry composition.

7. The apparatus of claim 6, wherein said primary specific gravity control system maintains the primary slurry composition at a specific gravity of about 1.3 or lower and wherein said secondary specific gravity control system maintains the secondary slurry composition at a specific gravity of about 1.4 or lower.

8. The apparatus of claim 1, wherein:

said primary scrubber comprises a generally vertically oriented, elongated chamber having a lower end and an upper end, wherein the gas inlet is located at about the lower end and wherein the gas outlet is located at about the upper end, and wherein said slurry atomizer is mounted at about the upper end, adjacent the gas outlet; and said secondary scrubber comprises a generally vertically oriented, elongated chamber having a lower end and an upper end, wherein the gas inlet is located at about the lower end and wherein the gas outlet is located at about the upper end and wherein said slurry atomizer is mounted at about the upper end, adjacent the gas outlet.

9. The apparatus of claim 8, wherein the lower end of said primary scrubber defines a collection sump, said collection sump of said primary scrubber collecting further concentrated primary ammoniated slurry, and wherein the lower end of said secondary scrubber defines a collection sump, said collection sump of said secondary scrubber collecting further concentrated secondary ammoniated slurry.

10. The apparatus of claim 1, wherein:

said primary scrubber comprises a generally vertically oriented, elongated chamber, wherein said gas inlet comprises a generally elongated, tube-like structure in which the slurry atomizer is positioned at about a distal end of the gas inlet; and said secondary scrubber comprises a generally vertically oriented, elongated chamber, wherein said gas inlet comprises a generally elongated, tube-like structure in which the slurry atomizer is positioned at about a distal end of the gas inlet.

11. The apparatus of claim 10, wherein:

said primary scrubber includes a bottom portion that defines a collection sump and said primary slurry tank, the bottom portion of said primary scrubber containing the primary slurry composition and collecting further concentrated primary ammoniated slurry formed in said primary scrubber; and said secondary scrubber includes a bottom portion that defines a collection sump and said secondary slurry tank, the bottom portion of said secondary scrubber containing the secondary slurry composition and collecting further concentrated secondary ammoniated slurry formed in said secondary scrubber.

12. The apparatus of claim 11, further comprising:

a demister mounted within said primary scrubber, the demister in said primary scrubber removing quantities of liquid contained in the partially processed gas stream before it exits said primary scrubber; and a demister mounted within said secondary scrubber, the demister in said secondary scrubber removing quantities of liquid contained in the fully processed gas stream before it exits said secondary scrubber.

13. The apparatus of claim 12, further comprising:

a first cleaning system operatively associated with said demister mounted within said primary scrubber; and a second cleaning system operatively associated with said demister mounted within said secondary scrubber.

14. The apparatus of claim 11, further comprising:

a first agitator operatively associated with the bottom portion of said primary scrubber; and a second agitator operatively associated with the bottom portion of said secondary scrubber.

15. The apparatus of claim 10, wherein the gas inlet and the gas outlet of said primary scrubber are located at about an upper end of said primary scrubber and wherein the gas inlet and the gas outlet of said secondary scrubber are located at about an upper end of said secondary scrubber.

16. The apparatus of claim 1, further comprising a blower operatively connected to the gas outlet of said secondary scrubber, said blower drawing the gas stream through said primary and secondary scrubbers.

* * * * *